(12) United States Patent
Iwasaki et al.

(10) Patent No.: US 7,588,813 B2
(45) Date of Patent: *Sep. 15, 2009

(54) DISPLAY STRIP AND A DISPLAY STRIP AND PRODUCT ASSEMBLY

(75) Inventors: Yoshio Iwasaki, Ritto (JP); Taro Hijikata, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 388 days.

This patent is subject to a terminal disclaimer.

(21) Appl. No.: 11/259,416

(22) Filed: Oct. 25, 2005

(65) Prior Publication Data

US 2006/0086682 A1   Apr. 27, 2006

(30) Foreign Application Priority Data

Oct. 26, 2004   (JP) .............................. 2004-311102

(51) Int. Cl.
  B32B 7/04   (2006.01)
  B32B 7/06   (2006.01)
  B32B 7/12   (2006.01)
  B32B 27/32  (2006.01)
  B32B 27/36  (2006.01)

(52) U.S. Cl. .................... 428/41.3; 428/40.1; 428/41.4; 428/41.7; 428/41.8; 428/42.2; 428/42.3; 428/43; 428/343; 428/346; 428/347; 428/349; 428/355 EN; 428/355 AC; 428/446; 428/447; 428/448; 428/451; 428/461; 428/483; 428/507; 428/511; 428/512; 428/514; 428/515; 428/516; 428/520; 428/522; 428/523; 283/101; 206/466

(58) Field of Classification Search .................. None
See application file for complete search history.

(56) References Cited

U.S. PATENT DOCUMENTS 3,029,939 A   4/1962   Feldman (Continued)

FOREIGN PATENT DOCUMENTS

DE          43 13 136        10/1994

(Continued)

OTHER PUBLICATIONS

European Search Report for corresponding European application No. 03778919.5-2038 lists the references above.

(Continued)

Primary Examiner—Vivian Chen
(74) Attorney, Agent, or Firm—Hogan & Hartson LLP

(57) ABSTRACT

The present invention provides a display strip easy for automating the process of bonding product-enclosed bags and capable of bonding the product-enclosed bags once removed again. The present invention relates to a display strip to which plural of product-enclosed bags are displayed and bonded, and said display strip is at least composed of a substrate layer and an adhesive layer, and said adhesive layer has a layer structure of two or more layers comprising a heat-sealable polymer layer in which an outmost layer includes a resin which has substantially no adhesion at a normal temperature and is bondable to said bags and a pressure sensitive adhesive layer including adhesives in which an inner layer of the above mentioned heat-sealable polymer layer shows adhesion at a normal temperature and further, said heat-sealable polymer layer has a weakness line in the vicinity of portions at which said product-enclosed bags are bonded so that said heat-sealable polymer layer is surely destroyed to expose said pressure sensitive adhesive layer when said product-enclosed bags bonded by heat seal are removed.

17 Claims, 5 Drawing Sheets

U.S. PATENT DOCUMENTS

| | | | |
|---|---|---|---|
| 3,608,707 A * | 9/1971 | Miller | 229/123.1 |
| 3,827,625 A * | 8/1974 | Miller | 383/211 |
| 3,864,895 A | 2/1975 | Petrea | |
| 4,013,188 A | 3/1977 | Ray | |
| 4,217,327 A * | 8/1980 | Cancio et al. | 264/293 |
| 4,337,862 A | 7/1982 | Suter | |
| 4,370,369 A | 1/1983 | Bonis | |
| 4,411,644 A * | 10/1983 | Tinklenberg | 493/213 |
| 4,415,087 A | 11/1983 | Clayton et al. | |
| 4,629,639 A | 12/1986 | Lucas | |
| 4,784,708 A | 11/1988 | Allen | |
| 4,817,805 A | 4/1989 | Rodriquez | |
| 4,886,690 A | 12/1989 | Davis et al. | |
| 5,089,320 A * | 2/1992 | Straus et al. | 428/216 |
| 5,120,781 A | 6/1992 | Johnson, Jr. | |
| 5,126,176 A | 6/1992 | Blaskovitz et al. | |
| 5,145,737 A | 9/1992 | Bolron et al. | |
| 5,209,972 A | 5/1993 | Super et al. | |
| 5,366,777 A | 11/1994 | Bown et al. | |
| 5,382,472 A * | 1/1995 | Yanidis et al. | 428/349 |
| 5,401,533 A * | 3/1995 | Borland | 427/208.2 |
| 5,433,060 A | 7/1995 | Gur et al. | |
| 5,589,246 A | 12/1996 | Calhoun | |
| 5,625,006 A | 4/1997 | Callahan et al. | |
| 5,679,421 A | 10/1997 | Brinton, Jr. | |
| 5,882,749 A * | 3/1999 | Jones et al. | 428/35.2 |
| 5,882,789 A * | 3/1999 | Jones et al. | 428/349 |
| 5,919,863 A | 7/1999 | Seppanen | |
| 5,922,428 A * | 7/1999 | Pufahl | 428/42.1 |
| 6,076,969 A * | 6/2000 | Jaisle et al. | 383/211 |
| 6,153,276 A | 11/2000 | Oya et al. | |
| 6,221,448 B1 | 4/2001 | Baetzold et al. | |
| 6,264,098 B1 | 7/2001 | Drummond et al. | |
| 6,322,899 B1 | 11/2001 | Karhuketo et al. | |
| 6,405,778 B1 | 6/2002 | Belt | |
| 6,481,184 B1 * | 11/2002 | Junker et al. | 53/413 |
| 6,500,536 B1 | 12/2002 | Yamada et al. | |
| 6,502,986 B1 * | 1/2003 | Bensur et al. | 383/211 |
| 6,543,208 B1 | 4/2003 | Kobayashi et al. | |
| 6,596,355 B1 * | 7/2003 | Mita et al. | 428/35.2 |
| 6,929,132 B2 * | 8/2005 | Belt | 211/113 |
| 6,960,635 B2 | 11/2005 | Stevens et al. | |
| 7,011,883 B2 | 3/2006 | Iwasaki et al. | |
| 7,147,913 B2 | 12/2006 | Iwasaki et al. | |
| 7,160,595 B2 | 1/2007 | Iwasaki et al. | |
| 7,243,796 B2 * | 7/2007 | Grablick | 206/460 |
| 2003/0113519 A1 | 6/2003 | Wasserman et al. | |
| 2004/0040919 A1 | 3/2004 | Iwasaki et al. | |
| 2004/0043175 A1 | 3/2004 | Iwasaki et al. | |
| 2004/0082452 A1 | 4/2004 | Taylor et al. | |
| 2004/0180118 A1* | 9/2004 | Renger et al. | 426/106 |
| 2004/0197514 A1 | 10/2004 | Iwasaki et al. | |
| 2004/0197577 A1 | 10/2004 | Iwasaki et al. | |
| 2005/0084636 A1* | 4/2005 | Papenfuss et al. | 428/35.7 |
| 2005/0123749 A1 | 6/2005 | Iwasaki et al. | |
| 2006/0086682 A1 | 4/2006 | Iwasaki et al. | |
| 2006/0163183 A1* | 7/2006 | Iwasaki | 211/113 |
| 2007/0092677 A1 | 4/2007 | Iwasaki et al. | |

FOREIGN PATENT DOCUMENTS

| | | | |
|---|---|---|---|
| DE | 4313136 A1 | 10/1994 | |
| DE | 19941431 | 3/2001 | |
| EP | 0 444 865 | 2/1991 | |
| EP | 0 576 993 | 6/1993 | |
| EP | 0 578 993 | 8/1993 | |
| EP | 95/21770 | 8/1995 | |
| EP | 0708162 | 4/1996 | |
| EP | 0 942 055 | 9/1999 | |
| EP | 0989162 | 3/2000 | |
| EP | 1085069 | 3/2001 | |
| EP | 1 167 220 | * | 5/2001 |
| JP | 44-1589 | 1/1969 | |
| JP | 47-042226 Y1 | 12/1972 | |
| JP | 62-251327 | 11/1987 | |
| JP | 63-132051 | 6/1988 | |
| JP | 02-34467 | 3/1990 | |
| JP | 03-069461 | 3/1991 | |
| JP | 03-200562 | 9/1991 | |
| JP | 04-001151 | 1/1992 | |
| JP | 04-115946 | 4/1992 | |
| JP | 06-293356 | 10/1994 | |
| JP | 07-041041 | 2/1995 | |
| JP | 07-289398 | 11/1995 | |
| JP | 08-276966 | 10/1996 | |
| JP | 08-290526 | 11/1996 | |
| JP | 08-323946 | 12/1996 | |
| JP | 09-164626 | 6/1997 | |
| JP | 10-080345 | 3/1998 | |
| JP | 10-100353 | 4/1998 | |
| JP | 10-202801 | 8/1998 | |
| JP | 10-230971 | 9/1998 | |
| JP | 11-079235 | 3/1999 | |
| JP | 11-148054 | 6/1999 | |
| JP | 11-165765 | * | 6/1999 |
| JP | 2000-129234 | 5/2000 | |
| JP | 2000-142650 | 5/2000 | |
| JP | 2000-185363 | 7/2000 | |
| JP | 2000-219789 | 8/2000 | |
| JP | 2001-122288 | 5/2001 | |
| JP | 2001-315836 | * | 11/2001 |
| JP | 2002-037279 | 2/2002 | |
| WO | 9308982 | 5/1993 | |
| WO | 94/24198 A1 | 10/1994 | |
| WO | 98/52823 | 11/1998 | |
| WO | 0167926 | 9/2001 | |
| WO | 2004/054895 | 7/2004 | |
| WO | 2005/120175 A2 | 12/2005 | |
| WO | 2005/120175 A2 | 12/2005 | |

OTHER PUBLICATIONS

Ullmann's Encyclopedia of Industrial Chemistry, 5th Ed., vol. A11 (1988), pp. 105-106.

Schmitz, Peter et al., "Films." Ullmann's Encyclopedia of Industrial Chemistry, 5th Ed., vol. A11 (1988), pp. 85-95, 108-110.

* cited by examiner (a)

(b)

ns to a display strip for holding
and displaying a plurality of product-enclosed bags thereto
for the display, and in particular, the present invention relates
to a display strip by which products once removed can be
suspended again.

BACKGROUND OF THE INVENTION

Some products such as snack foods are generally packaged in bags by vertical or horizontal packaging machines for sale. In many cases, product-enclosed bags are arranged and sold on display racks in stores. However, in such cases, each and every bag had to be placed in the racks by hand, and the display place for sale was restricted to the given racks.

On the other hand, a display method for product, called strip-pack display system is known in which no display rack is required. The strip-pack display system provides, as shown in FIG. 5, an arrangement in which a plurality of products B are bonded to a tape material with a prescribed width (display strip S) and suspended. This display form requires no display rack and enables display and sale at any place, such as a place beside a register of a store, and a front desk area of a hotel.

Conventionally, as a display strip, those to which product-enclosed bags are bonded by adhesive force of the pressure sensitive adhesive tapes, such as those which comprise pressure sensitive adhesive tapes or those which are produced by previously punching holes in prescribed positions of tapes made of paper or resins and bonding pressure sensitive adhesive tapes from the rear face sides, have been employed. Such display strips are advantageous in that products can be bonded again after once bonded products are removed.

However, these display strips had a problem in that it was difficult to automate a step of attaching product-enclosed bags to the display strips by a machine. That is, when it was tried to automate the attachment step for such display strips while the pressure sensitive adhesive tapes being exposed, the display strips were stuck to rollers and the like in passing through a machine to make it impossible to feed tapes as desired. On the other hand, when the pressure sensitive adhesive surfaces were covered with releasing sheets and the like, the work of bonding products consequently became complicated to make the automation difficult. Further, there was another problem that dust and stains were stuck to the surfaces of the pressure sensitive adhesive tapes thereby worsening appearance.

Against this problem, a display strip, of which a heat-sealable polymer layer is formed on one side, is proposed so that product-enclosed bags may be directly attached by heat bonding. With such display strips, it is very easy to continuously automate a series of steps of bonding the product-enclosed bags to the display strips and enclosing a product in a bag.

However, in a display strip and product assembly in which product-enclosed bags and a display strip are heat bonded by heat seals, once product-enclosed bags are removed from a display strip, in order to bond them to a display strip again, for example, the bags must be heat bonded to a display strip again by hand sealers and the like, which takes a lot of trouble and at stores and the like, there have been problems that it is difficult to bond once removed bags to a display strip again.

It could frequently occur that prospective purchasers of products and the like take product-enclosed bags in hands and return them again on second thought and a display strip and product assembly by conventional heat seals could not cope with such cases.

In view of the state of the art, it is an object of the present invention to provide a display strip with which steps of bonding product-enclosed bags thereto can easily be automated and once removed product-enclosed bags can be easily bonded again.

SUMMARY OF THE INVENTION

The present invention relates to a display strip for holding and displaying a plurality of product-enclosed bags, comprising at least a substrate layer and an adhesive layer, said adhesive layer has layer structure of two or more layers comprising a heat-sealable polymer layer which composes the outmost layer of the display strip and a pressure sensitive adhesive layer which composes the inner layer of said heat-sealable polymer layer, said heat-sealable polymer layer includes a hot melt resin which has substantially no adhesion at a normal temperature and is bondable to said bags, said pressure sensitive adhesive layer comprises adhesives which have adhesion at a normal temperature, and said heat-sealable polymer layer has a weakness line at least in the vicinity of portions at which said product-enclosed bags are heat bonded.

A display strip of the present invention comprises at least a substrate layer and an adhesive layer.

The above mentioned adhesive layer has a layer structure of two or more layers comprising a heat-sealable polymer layer in which an outmost layer thereof include a hot melt resin which shows substantially no adhesion at a normal temperature and is bondable to said bags and a pressure sensitive adhesive layer including adhesives in which an inner layer of the above mentioned heat-sealable polymer layer shows adhesion at a normal temperature. In a display strip of the present invention with such a structure, by heat sealing heat-sealable polymer layer composing the outmost surface of the above mentioned pressure sensitive adhesive layer and product-enclosed bags, a hot melt resin in the above mentioned heat-sealable polymer layer is melted thereby capable of bonding above mentioned bags.

DETAILED DESCRIPTION OF THE PREFERRED EMBODIMENTS

Figure 1:
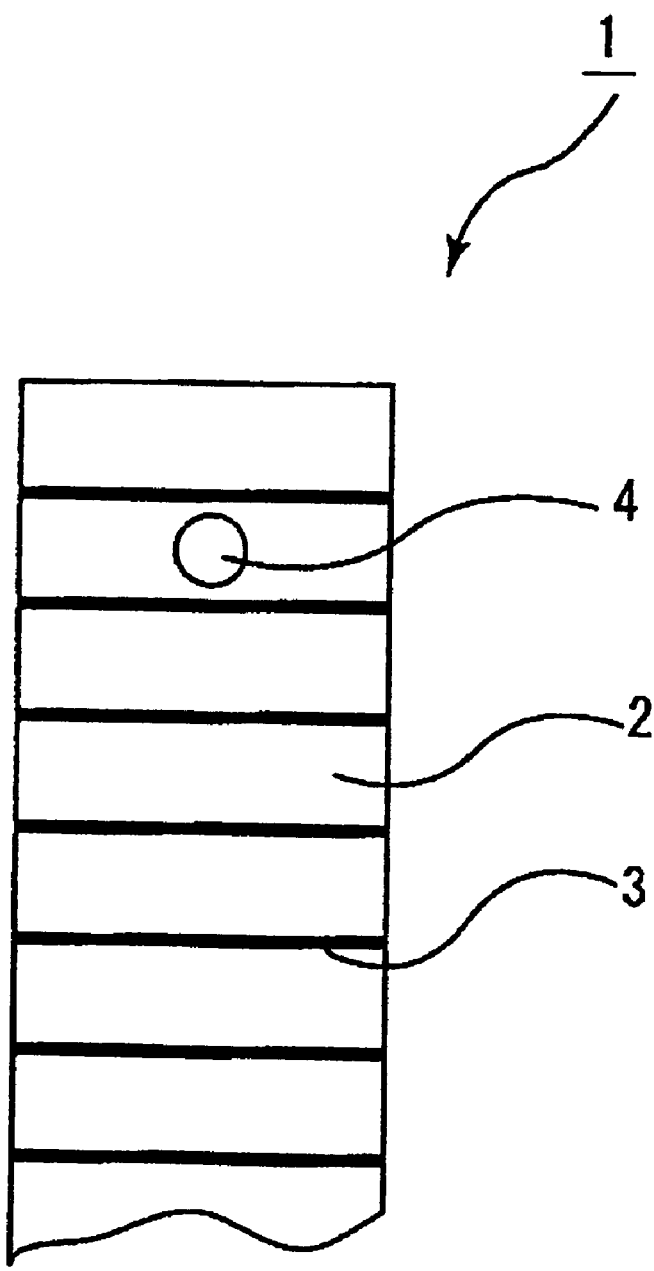
FIG. 1 is a front view showing a frame format of a part of a display strip of the present invention.

Hereinafter, the embodiment of the present invention is explained in detail. The present invention is not limited to this embodiment. A display strip of the present invention comprises at least a substrate layer and an adhesive layer. The above mentioned adhesive layer has a layer structure composed of two or more layers which are a heat-sealable polymer layer which includes a hot melt resin in which the outmost layer shows substantially no adhesion at a normal temperature and is bondable to said bags and a pressure sensitive adhesive layer which includes adhesives in which the inner layer of the above mentioned heat-sealable polymer layer shows adhesion at a normal temperature, and further, at an upper portion, suspending-use hole punches are provided.

As a hot melt resin included in the above mentioned heat-sealable polymer layer, it is not specifically limited as long as it shows no adhesion at a normal temperature and is bondable to said bags, and for example, polypropylene, copolymers of propylene, and other olefin (ethylene, C 4-12 α-olefin), low density polyethylene (including metallocene linear low-density polyethylene), ethylene/vinyl acetate copolymer, ethylene ester methacrylate copolymer, and the like are exemplified. Among them, metallocene linear low-density polyethylene and ethylene/vinyl acetate copolymer are preferable. Further, the above mentioned heat-sealable polymer layer may be single-layered or multi-layered comprising plurality of layers.

When the above mentioned hot melt resin is ethylene/vinyl acetate copolymer, it is preferable that the above mentioned heat-sealable polymer layer further include tackifiers. Although the above tackifiers are not specifically limited, for example, resins selected at least one from the group of rosin resins, terpene resins, aliphatic hydrocarbon resins, alicyclic hydrocarbon resins, and aromatic hydrocarbon resins are preferably used.

As said rosin resins, they are not specifically limited and for example, rosin, rosin derivative, rosin ester, gum rosin, wood rosin, tall oil rosin, distilled rosin, hydrogenated rosin, dimerizable rosin, polymeric rosin, glycerol ester of natural rosin, glycerol ester of modified rosin, pentaerythritol ester of natural rosin, pentaerythritol ester of modified rosin, glycerol ester of light-color wood rosin, glycerol ester of hydrogenated rosin, glycerol ester of polymeric rosin, pentaerythritol ester of hydrogenated rosin, phenolic modified pentaerythritol ester of rosin, and the like can be exemplified.

As the above mentioned terpene resin, they are not specifically limited and for example, terpene, phenolic terpene, modified terpene, a-pinene polymer and -pinene polymer, dipentene polymer, terpene-phenol copolymer, and the like can be exemplified.

As the above mentioned aliphatic hydrocarbon resins, they are not specifically limited and polymers whose main component is C4-5 monoolefin or diolefin such as 1-butene, isobutylene, butadiene, 1,3-pentadiene, and the like can be exemplified.

As the above mentioned alicyclic hydrocarbon resins, they are not specifically limited and for example, resins in which dimerized diene components by cyclizing in spent C4-C5 fraction are polymerized, resins in which cyclic monomers are polymerized such as cyclopentadiene and the like, hydrogenated dicyclopentadiene resins, hydrogenated petroleum resins, and the like can be exemplified.

As the above mentioned aromatic hydrocarbon resins, they are not specifically limited and for example, vinyltoluene, indene, styrene polymer, α-methyl styrene copolymer, and the like are exemplified.

Further, as the above mentioned tackifiers, for example, commercially available ones such as those described in U.S. Pat. No. 6,117,945 can be used.

In addition, since the above mentioned heat-sealable polymer layer does not show adhesion at a normal temperature, it acts as a mask layer which covers a pressure sensitive adhesive layer formed inside of above mentioned heat-sealable polymer layer as well. With such a mask layer, a display strip of the present invention does not show adhesion before heating thereby capable of easily automating the steps of heat bonding bags.

Although thickness of the above mentioned heat-sealable polymer layer is not specifically limited, preferable upper limit thereof is 20 μm. When the thickness exceeds 20 μm, when once bags heat bonded to heat-sealable polymer layer is removed, it may happen that pressure sensitive adhesive layer inside is not exposed, thereby incapable of bonding the bags again.

It is preferable that silicone treatment is conducted on a surface of a pressure sensitive adhesive layer side of the above mentioned heat-sealable polymer layer. As described later, in a display strip of the present invention, when product-enclosed bags attached to the above heat-sealable polymer layer by heat seals is removed, the heat-sealable polymer layer at the part where the above mentioned bags are bonded are peeled off with bags. In such a display strip of the present invention, it is very important to regulate adhesion between the above mentioned heat-sealable polymer layer and a pressure sensitive adhesive layer. By silicone treatment on a surface of a pressure sensitive adhesive layer side of above mentioned heat-sealable polymer layer, adhesion between the above mentioned heat-sealable polymer layer and a pressure sensitive adhesive layer can freely be regulated.

Above mentioned silicone treatment methods are not specifically limited and for example, methods of coating a pressure sensitive adhesive layer side of the above heat-sealable polymer layer with silicone materials such as commercially available silicone treatment agents used for the uses which require releasability, and the like can be exemplified.

In addition, although the above mentioned silicone treatment may be conducted on whole surfaces in the above mentioned pressure sensitive adhesive layer side of the above mentioned heat-sealable polymer layer, it is preferable that the silicone treatment is conducted to form a sea-island structure. When the above mentioned silicone treatment is conducted on surfaces in the above mentioned pressure sensitive adhesive layer side of the above heat-sealable polymer layer in a sea-island structure, preferable lower limit per 1 $cm^2$ is about 10 dot and preferable upper limit is about 100 dot.

Above mentioned pressure sensitive adhesive layer is the inner layer of the above mentioned heat-sealable polymer layer and comprise adhesives which show adhesion at a normal temperature. As above mentioned adhesives, they are not specifically limited as long as they show adhesion at a normal temperature, they are preferably rubber-based adhesives or acrylic adhesives.

By having a pressure sensitive adhesive layer containing adhesives showing adhesion at a normal temperature, a display strip of the present invention is capable of surely holding the product-enclosed bags even when the products enclosed in bags are heavy weighted since adhesion of the above mentioned pressure sensitive adhesive layer is added to bonding force between a heat-sealable polymer layer and bags by heat seals. Further, as mentioned later, when the bonded bags are removed since a pressure sensitive adhesive layer is exposed with a heat-sealable polymer layer in the part where the above mentioned bags are bonded peeled off with bags in a display strip of the present invention, the removed bags can be bonded again to this exposed pressure sensitive adhesive layer.

Although thickness of the above mentioned pressure sensitive adhesive layer is not specifically limited, preferable lower limit is 10 pm and preferable upper limit is 300 pm. When the thickness is less than 10 μm, the above mentioned pressure sensitive adhesive layer is also peeled off together with the above mentioned heat-sealable polymer layer when once bonded bags are removed, thereby incapable of bonding bags again. On the other hand, when the thickness is greater than 300 μm, adhesion strength becomes too high and product-enclosed bags once bonded are hard to detach.

Although the above substrate layer is not specifically limited, from the use of bonding and suspending many products, the substrate layer preferably has satisfactory strength and has thermal resistant property so that the layer is not fused or deteriorate at the time of heat sealing. Preferable examples include a biaxial oriented polypropylene (OPP), a biaxial oriented polyethylene terephthalate, a metal foil, a paper, non-woven cloths, woven cloths, or laminates thereof and the like. Among them, laminates in which woven cloths are laminated on resin films composed of above mentioned a biaxial oriented polypropylene or a biaxial oriented polyethylene terephthalate or a paper is preferable and laminates in which a woven cloth are sandwiched between two resin films composed of a biaxial oriented polypropylene or a biaxial oriented polyethylene terephthalate or two papers are even more preferable. Since mechanical strength of a display strip of the present invention becomes very high, for example, even when a hole punch for suspending is formed on a display strip of the present invention and when a hook is suspended to said punch, breakage is not liable to occur at the above mentioned hole punch portion due to increased hole punch strength.

Although the above mentioned woven cloths are not specifically limited, woven cloths obtained from filament conventionally used as reinforcing agents by conventionally known methods such as plain weave, twill weave, leno weave and the like are used. Although deniel ratio of the above mentioned woven cloths is not specifically limited, about 6 to 20 warps per inch is suitable. If there are appropriate spaces between warp yarns and weft yarns, when laminated with the above mentioned resin films, some part of resins composing resin films invades in spaces between warp yarns and weft yarns, and then integrated, thereby improving adhesion between a woven cloth and a resin film.

Although the above mentioned woven cloths are not specifically limited, those composed of polyolefin yarns such as high density polyethylene, low density polyethylene, metallocene linear low-density polyethylene, isotactic polypropylene, syndiotactic polypropylene, and the like are preferable in view of mechanical property and the like required for a display strip and the like, and in view of adhesion and the like when a woven cloth is laminated with the above mentioned resin film. Although the above mentioned polyolefin yarns may be composed of a single resin, as required, such yarns may be composite yarns in which high-melting polymer and low-melting polymer are combined. By using such composite yarns, both excellent mechanical strength and good adhesion to resin films can be fulfilled.

As the above mentioned polyolefin yarns, they are not specifically limited and for example, multifilament yarns, mono filament yarns, flat yarns, split yarns, and the like can be used. Among them, flat yarns and split yarns are preferable. Here, flat yarns are yarns formed by slitting the molded films obtained by extrusion molding methods and the like in prescribed width, followed by orienting and heat-setting. Split yarns are also yarns in which flat yarns are subjected to further divided weave. Flat yarns and split yarns are known to have extremely high tensile strength and tearing strength.

Finenesses of the above mentioned polyolefin yarns are not specifically limited and yarns with about 100 to 5000 d which are usually used can be used.

Although resin films composing the above substrate layer are not specifically limited, films composed of polyester, polyolefin, or the like are preferable. Among them, polyester films are preferable in that they have appropriate rigidity and mechanical strength. For information, when adhesion between a polyester film and the above woven cloth is low, a polyester film and a woven cloth may be laminated interposing a polyolefin film.

Although methods of producing the above substrate layer are not specifically limited, for example, such methods as forming a resin film layer by extrusion-molding of a polymer on the above woven cloth; carrying out dry laminating of resin films on the woven cloth; pressure bonding resin films on woven cloth; laminating the woven cloth extruding polyethylene on resin films such as polyester and the like, or paper; and the like are exemplified.

Although thickness of the above mentioned substrate layer is not specifically limited, preferable lower limit is 30 μm and preferable upper limit is 500 μm. When the thickness is less than 30 μm, satisfactory hole punch strength cannot be obtained and there lies a concern of breakage of said substrate when product-enclosed bags are removed. On the other hand, when thickness is greater than 500 μm, heat may not be fully transmitted to an adhesive layer at the time of heat sealing since a substrate layer acts as thermal insulating materials.

The above mentioned adhesive layer and a substrate layer may be laminated interposing adhesives by known dry laminate methods or they may be laminated by thermal laminating methods using no solvents.

In a display strip of the present invention, it is preferable that the above mentioned substrate layer and a pressure sensitive adhesive layer are laminated interposing an intermediate layer composed of polyethylene. Since polyethylene is flexible and have high tensile strength, by having the above mentioned intermediate layer composed of polyethylene, strength of a display strip as a whole and hole punch strength can be improved. The above mentioned intermediate layer composed of polyethylene can be laminated by extrusion molding polyethylene between the above mentioned substrate layer and an adhesive layer. Here, other than polyethylene, ethylene-(meth)acrylic acid copolymers or ionomer of ethylene-(meth)acrylic acid copolymers may be used.

Although the thickness of the above polyethylene layer is not specifically limited, preferable lower limit is 5 pm and preferable upper limit is 5 μm. When the thickness of a polyethylene layer is less than 5 μm, satisfactory improvement effect in strength may not be obtained, and on the other hand, when the thickness of polyethylene layer is greater than 50 μm, the thickness of a display strip as a whole becomes large, thereby inhibiting heat bonding caused by heat insulating effect.

In a display strip of the present invention, it is preferable that an anchor coat layer is formed between the above mentioned substrate layer and a pressure sensitive adhesive layer. With the anchor coat layer, bonding force between the above mentioned substrate layer and a pressure sensitive adhesive layer becomes stronger and peel off between the substrate layer and pressure sensitive adhesive layer is less likely to occur. As the above mentioned anchor coat layer, they are not specifically limited and for example, those composed of conventionally known anchor coat agents such as polyisocyanate/polyester series two-component cure pressure sensitive adhesive agents and the like are exemplified. By coating resin film surfaces on which adhesives are coated with such anchor coat agents, an anchor coat layer is formed.

In a display strip composed of the above mentioned substrate layer and an adhesive layer, in the above mentioned heat-sealable polymer layer, a weakness line is provided in the vicinity of portions to which the above mentioned product-enclosed bags are heat bonded so that said heat-sealable polymer layer is surely destroyed to expose said pressure sensitive adhesive layer when said product-enclosed bags bonded by heat seals are removed.

Figure 2:
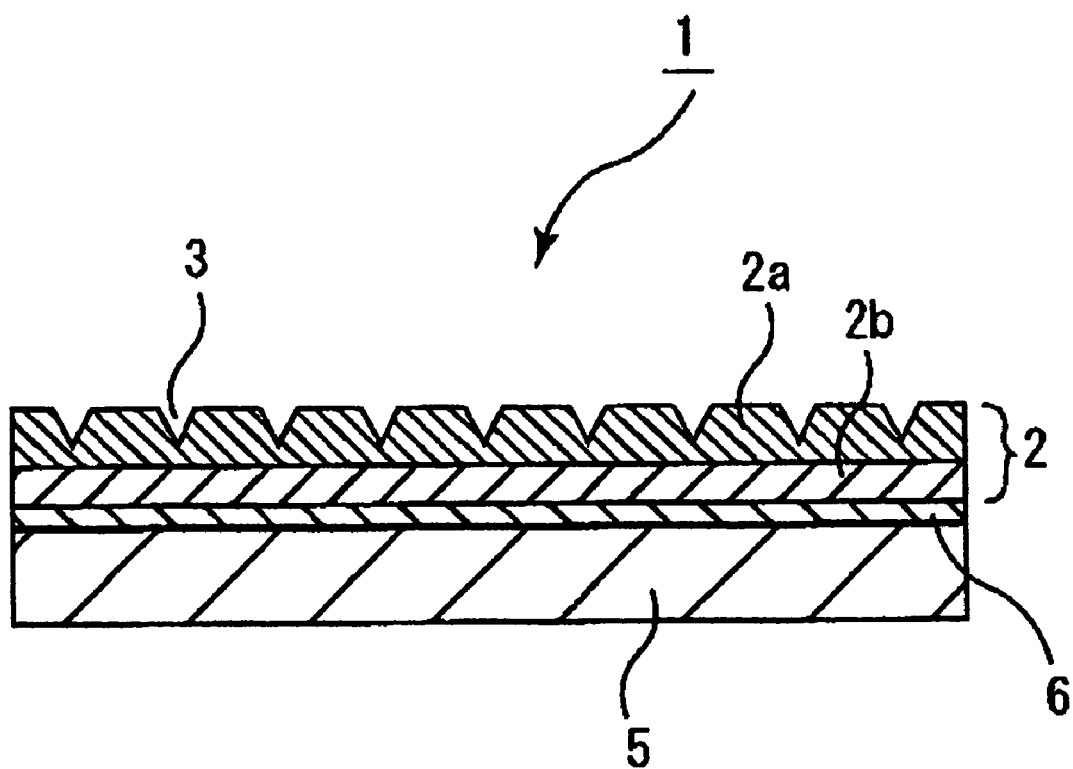
FIG. 2 is a longitudinal section view of a display strip shown in FIG. 1.

FIG. 1 is a front view showing a frame format of a part of a display strip of the present invention and FIG. 2 is a longitudinal section of a display strip shown in FIG. 1. As shown in FIGS. 1 and 2, a display strip 1 of the present invention has a belt-like structure in which an adhesive layer 2 is laminated on a substrate layer 5 interposing an anchor coat layer 6 and on the upper side, a hole punch 4 for suspending a display strip 1 of the present invention with product-enclosed bags bonded is formed.

Further, an adhesive layer 2 is composed of a heat-sealable polymer layer 2a which makes up an outmost layer and a pressure sensitive adhesive layer 2 b which is laminated on an anchor coat layer 6 inside of a heat-sealable polymer layer 2a, and on the outmost surface of heat-sealable polymer layer 2a (opposite side of adhesive layer 2 b), equally spaced plural of weakness lines 3 are formed vertically in the longitudinal direction of a display strip 1 of the present invention. Weakness line 3 is formed in the vicinity of portions to which said product-enclosed bags are heat bonded so that said heat-sealable polymer layer 2 a is surely destroyed to expose said pressure sensitive adhesive layer 2 b when said product-enclosed bags heat bonded by heat seals are removed. In other words, in a display strip 1 of the present invention shown in FIG. 1, product-enclosed bags are heat bonded in the region divided by weakness lines 3.

In a display strip of the present invention, it is preferable that a weakness line formed on the above mentioned heat-sealable polymer layer is a slit or a perforation. It is also preferable that a weakness line formed on the above mentioned heat-sealable polymer layer is a continuous line or a broken line. Further, as the above mentioned cut shapes, they are not specifically limited as long as they have shapes by which the region for product-enclosed bags to be heat bonded is divided and other than shapes such as a weakness line 3 shown in FIG. 1 equally spaced and formed vertically in the longitudinal direction of a display strip, for example, various shapes such as rectangular, circular, elliptical, track, and the like can be exemplified. Among them, from the view point of easy and precise forming process, as a weakness line 3 shown in FIG. 1, the shape equally spaced and formed vertically in the longitudinal direction of a display strip is preferable.

In short, said weakness line is preferably formed along the portion where said bags are heat bonded by heat bonding. In addition, said weakness line is preferably formed in the width direction with intervals in the longitudinal direction of the display strip, and said weakness line is preferably formed extending to the edge in the width direction of the heat-sealable polymer layer along the portion in which said bags are heat bonded by heat sealing. Further, such composition can also be employed that other weakness line is further formed in the portion in which said bags are heat bonded by heat sealing and that said bags can be heat bonded to said heat-sealable polymer layer across said weakness line. Moreover, such composition can also be employed that said weakness line is formed in the both directions of the width direction and the longitudinal direction of a display strip. By compositions of said weakness line, in various patterns such as lattice-shapes, rhombus-shapes, and the like, regions in which bags can be heat bonded can be divided and formed.

Since the above mentioned weakness line is formed on a heat-sealable polymer layer of above mentioned adhesive layer, the above mentioned heat-sealable polymer layer is more likely to be destroyed along the above mentioned weakness line. Thus, when product-enclosed bags bonded in the regions which are divided by above mentioned weakness lines by heat sealing is removed, a heat-sealable polymer layer in the regions divided by the above mentioned weakness lines is surely destroyed and peeled off with bags to expose a pressure sensitive adhesive layer. Therefore, once removed bags can be bonded again by making the bags adhere to said exposed pressure sensitive adhesive layer. As mentioned above, since in a display strip of the embodiment of the present invention, the outmost layer is a heat-sealable polymer layer which include a hot melt resin which shows substantially no adhesion at a normal temperature and is bondable to said bags, it is extremely easy to automate a series of processes in which above mentioned bags are bonded to a display strip and of processes in which products are sealed in bags consecutively. On the other hand, when bags once bonded to a display strip are removed, the above mentioned heat-sealable polymer layer is peeled off along with the above mentioned weakness line with bags, a pressure sensitive adhesive layer which includes adhesives showing adhesion at a normal temperature are exposed, by adhering bags to the exposed pressure sensitive adhesive layer, bags once removed can be bonded again without using hand sealers and the like.

Methods for forming the above mentioned weakness line is not specifically limited and for example, such methods as forming the above mentioned weakness line beforehand on the above mentioned heat-sealable polymer layer, followed by bonding on the above mentioned pressure sensitive adhesive layer; forming the above mentioned weakness line on the above mentioned heat-sealable polymer layer together with bonding the above mentioned heat-sealable polymer layer on the above mentioned pressure sensitive adhesive layer; or forming the above mentioned weakness line at the time of a slit process in which a display strip of the present invention is produced is exemplified. Further, as a forming method of the above mentioned seakness line, it is not specifically limited, however, it is preferable that the above mentioned weakness line is formed with depth for completely cutting a heat sealable polymer layer film, for example, formed deep slightly entering in an adhesive layer, for example, so that said bags can easily and completely be peeled off in the specific regions at which said bags are heat bonded. By this, a display strip can be obtained having an adhesive layer provided with a heat-sealable polymer layer. The heat-sealable polymer layer of the present invention includes such a structure.

Shapes of a display strip of the present invention are not specifically limited and for example, tape shapes, seat shapes and the like can be exemplified.

In addition, it is preferable that suspending-use holes (hole punches) for suspending a display strip itself are provided at the one end of a display strip of the present invention as hole punch 4 in FIG. 1. By hooking a fixer on the above mentioned hole punch, a display strip and product assembly manufactured by heat bonding bags on a display strip of the present invention can be displayed as strip-packs. Further, it is preferable that the above mentioned suspending-use holes are formed only at the upper end of a display strip of the present invention. When suspending-use holes are also formed at the lower end of the display strip, a display strip and product assembly may be suspended upside down at stores and the like.

When the above mentioned hole punch is provided on a display strip of the present invention, it is preferable that the above mentioned substrate layer has a structure in which a woven cloth is included. As mentioned above, when the above mentioned substrate layer has a structure in which a woven cloth is included, mechanical strength of a display strip of the present invention becomes extremely high, and therefore, damage is less likely to occur at the above mentioned hole punch portion when a display strip and product assembly manufactured by heat bonding bags to a display strip of the present invention by hooking a fixer on the above mentioned hole punch is displayed as strip-packs.

Methods of manufacturing a display strip of the present invention are not specifically limited and conventionally known methods can be used. For example, methods of forming a heat-sealable polymer layer comprising the steps of forming pressure sensitive adhesive layer by coating a substrate layer with adhesive paste which includes adhesives showing adhesion at a normal temperature by gravure methods or calendar methods to have specific thickness, followed by laminating films which include hot melt resins imparting heat seal property but not showing adhesion at a normal temperature are exemplified.

As bags for enclosing products which are bonded to a display strip of the present invention, any of commonly used bags can be used. For example, bags whose surfaces which are composed of a biaxial oriented polypropylene (OPP) layer/a printing layer/a polyethylene (PE) layer/an aluminum deposited polyethylene terephthalate (PET) layer/a polyethylene (PE) layer/a non-stretched polypropylene (CPP) layer, a transparent deposited biaxial oriented polyethylene terephthalate (PET) layer/a printing layer/a non-stretched polypropylene (CPP) layer, and the like, or bags in which the outmost layer has a heat-sealable adhesive layer and the like are used. As bags having a heat-sealable adhesive layer in the outmost layer, for example, in the United States, bags composed of a heat-sealable biaxial oriented polypropylene (OPH) layer/a printing layer/a polyethylene (PE) layer/an aluminum deposited heat-sealable a biaxial oriented polypropylene (OPH) layer are used and such bags can preferably be bonded to a display strip of the present invention.

Figure 3:
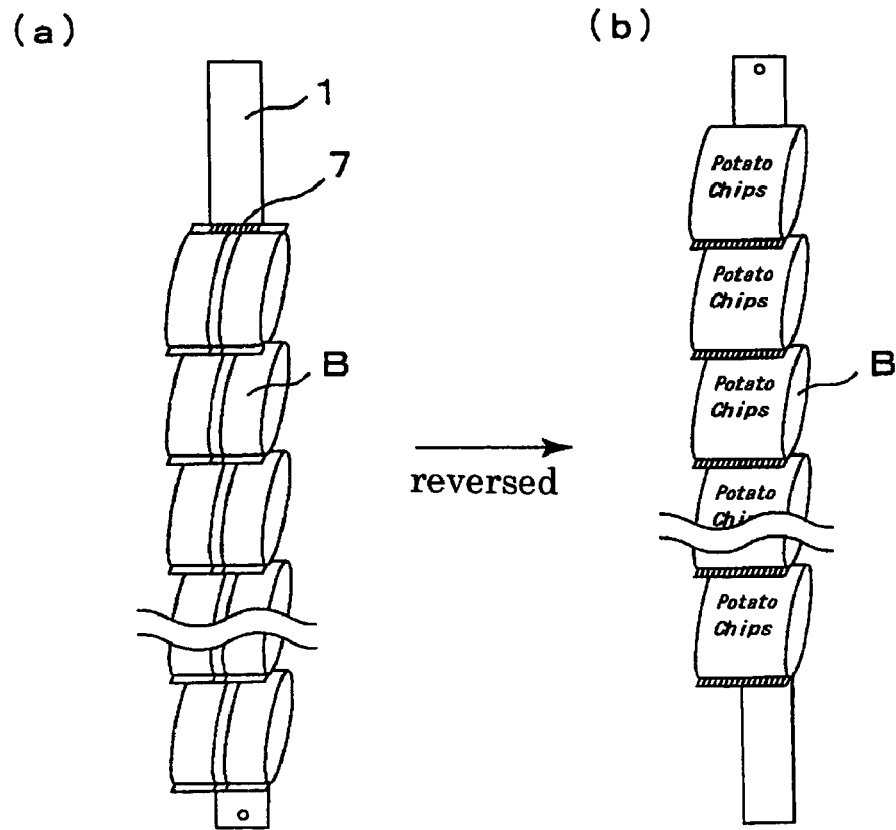
FIGS. 3(a)-3(c) is a view showing a frame format of one example of a process of bonding product-enclosed bags to a display strip of the present invention.
Figure 3:
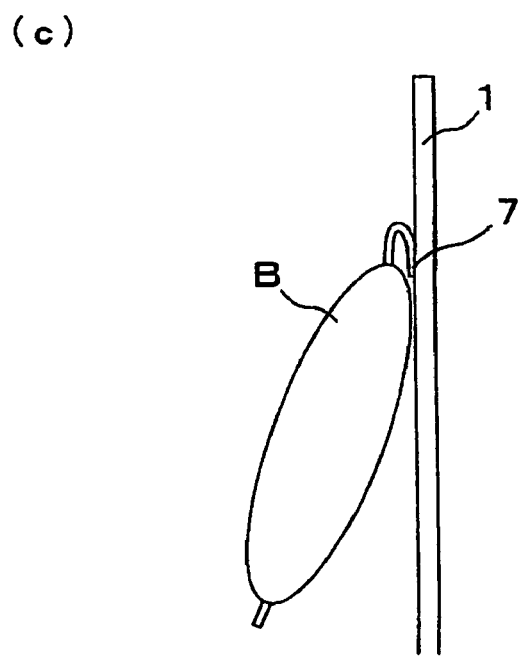

Although methods of bonding product-enclosed bags to a display strip of the present invention are not specifically limited, for example, it is preferable to bond them following the steps shown in FIG. 3. By this method, first of all, product-enclosed bags are placed so that face sides of bags B contact with a display strip 1, and next, the upper portions of bags B are heat bonded to bond bags with a display strip 1 (FIG. 3a). At this stage, a pressure bonding portion 7 is required to be within the range divided by weakness lines formed on heat-sealable polymer layer which constitute an outmost surface of a display strip 1 of the present invention. By turning each of product-enclosed bags B upside down to pressure bonding portions 7 at a point where bags B with specific number of products enclosed are heat bonded to a display strip 1, surfaces of bags B are made to be opposite sides of a display strip 1 (FIG. 3 b) When one end of a display strip 1 is displayed suspended from hooks and the like in this state, since a bonding portion 7 of bags B and a display strip 1 is as shown in FIG. 3c, by pulling product-enclosed bags downward, they can be easily removed from a display strip 1 with a heat-sealable polymer layer within the region divided by the above mentioned weakness lines.

A display strip and product assembly in which product-enclosed bags are bonded to the above mentioned display strip of the present invention is also one of the present inventions.

In a display strip and product assembly of the present invention, although seal strength of a bag and a display strip is not specifically limited, preferable lower limit thereof is 1N/30 mm and preferable upper limit thereof is 50N/30 mm. When seal strength is less than 1N/30 mm, depending on weights of products, products may fall by their dead weights, and on the other hand, when seal strength is greater than 50N/30 mm, sometimes product-enclosed bags may not be removed even when bags are pulled in a suspension state. More preferable lower limit is 5N/30 mm and more preferable upper limit is 30N/30 mm.

Figure 4:
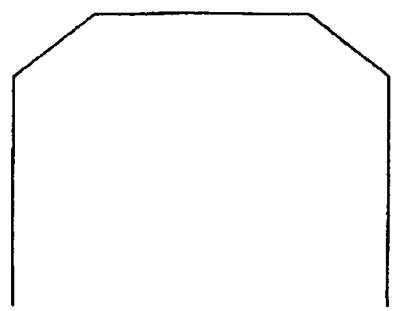
FIGS. 4(a)-4(b) is a front view showing a frame format of a seal jaw used in manufacturing a display strip and product assembly of the present invention.
Figure 4:
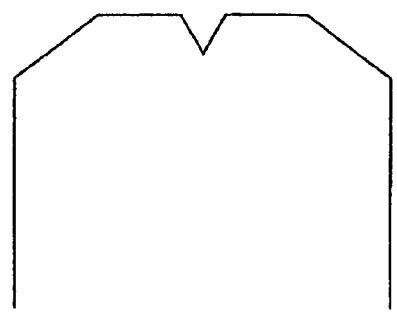
Figure 5:
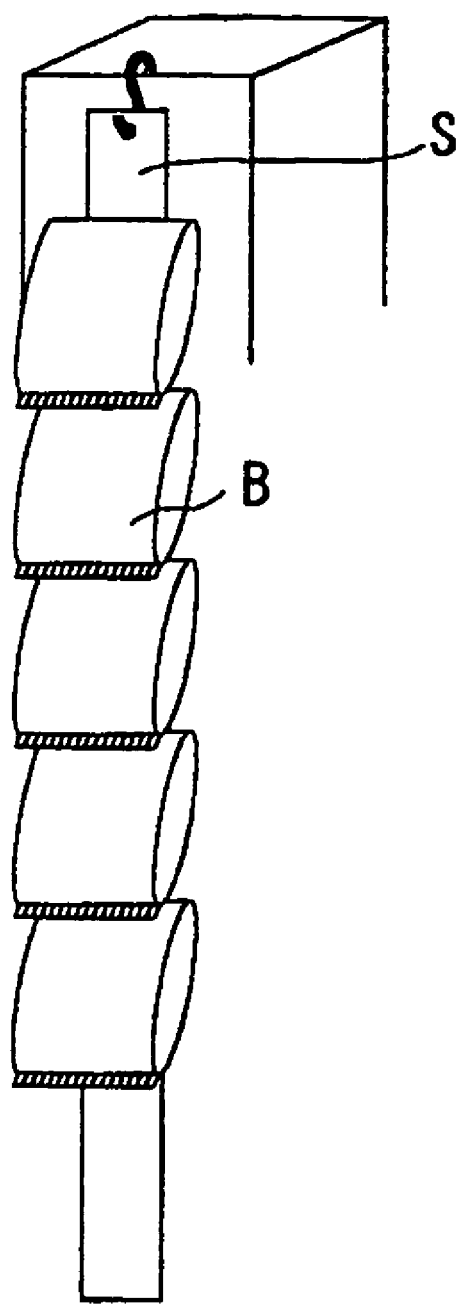
FIG. 5 is a front perspective view showing one example of a strip-pack display.

For information, regarding the sealing state or state of peeling off a bag and a display strip, they may change greatly depending on sealing condition. Sealing condition may change depending not only on a temperature at a time of sealing, contact time of seal jaws, contact pressure and the like, but also on shapes of seal jaws. As shapes of seal jaws, for example, such shapes as shown in FIG. 4 can be employed. Therefore, it is preferable to select optimum sealing condition depending on kinds of resin compositions which make up an adhesive layer of the above mentioned display strip or on materials of surface layers of the above mentioned bags. Width of a seal jaw is selected depending on desired length of a bonding surface of a display strip and a bag surface, and this length substantially determines the distance from the beginning of peeling off to the completion of peeling off when bags are peeled off from a display strip.

Next, a display strip of the present invention relating to another embodiment is explained. A display strip of the present invention relating to another embodiment is a display strip for bonding and displaying plural of product-enclosed bags arranged and it is composed at least of a substrate layer and an adhesive layer, and the above mentioned substrate layer has a structure of including a woven cloth, and the above mentioned adhesive layer has a layer structure composed of two or more layers which are a heat-sealable polymer layer which includes a hot melt resin in which an outmost layer shows substantially no adhesion at a normal temperature and is bondable to said bags and a pressure sensitive adhesive layer which includes adhesives in which an inner layer of the above mentioned heat-sealable polymer layer shows adhesion at a normal temperature, and further, at an upper portion, suspending-use hole punches are provided.

A display strip of the present invention related to another embodiment is composed of a substrate layer and an adhesive layer. The above mentioned substrate layer has a structure in which a woven cloth is included. Although the above mentioned substrate layer is not specifically limited, such a substrate layer as explained in the above mentioned display strip of the present invention is preferably used. Further, although the above mentioned woven cloth is not specifically limited, such a woven cloth as explained in the above mentioned display strip of the present invention is preferably used.

In a display strip of the present invention related to another embodiment, as the abovementioned adhesive layer, except that a weakness line is not provided, such an adhesive layer having the same structure as explained in the above mentioned display strip of the present invention is exemplified. In other words, the above mentioned adhesive layer has a layer structure composed of two or more layers which are heat-sealable polymer layer in which the outmost layer includes a hot melt resin which shows substantially no adhesion at a normal temperature but is bondable to said bags and a pressure sensitive adhesive layer in which an inner layer of the above mentioned heat-sealable polymer layer shows adhesion at a normal temperature.

In a display strip of the present invention related to another embodiment, at the upper portion thereof, suspending-use hole punches are provided. In other words, a display strip and product assembly in which product-enclosed bags are bonded to a display strip of the present invention is displayed by hooking the above mentioned hole punches on a hook.

As shapes of the above mentioned hole punches, they are not specifically limited as long as the shapes allow a hook to insert, and any shape such as circular, elliptical, prismatic, track or combinations thereof can be exemplified. Further, sizes thereof are not specifically limited and although they are appropriately determined depending on sizes of hooks formed on the above bags, sizes of bags, and the like, when the shapes of the above mentioned hole punches are circular, lower limit thereof is commonly about 5 mm and upper limit thereof is commonly about Ø 5 mm and upper limit thereof is commonly about Ø 10 mm.

The number of the above mentioned hole punches is not specifically limited and for example, only one hole punch may be provided on the upper portion or plural of hole punches may be provided in the width direction in line and further, plural of them may be provided in the length direction with specific spaces.

In a display strip of the present invention having the above mentioned adhesive layer related to another embodiment, when the product-enclosed bags which are heat bonded on a heat-sealable polymer layer which is the outmost layer of the above mentioned adhesive layer is removed, a heat-sealable polymer portion at which one of the above mentioned bags is removed is peeled off together with bags, thereby exposing a pressure sensitive adhesive layer underneath and capable of bonding once removed bags again.

In addition, by enhancing bonding strength of the above mentioned heat-sealable polymer layer and the bag, a heat-sealable polymer layer portion at which the bag is bonded can surely be peeled off together with the bag. In this case, large stress is applied to the above mentioned hole punch portion when the bag is removed. However, a display strip of the present invention related to another embodiment, since the above mentioned substrate layer has the structure which includes a woven cloth, hole punch strength becomes excellent and even when large stress is applied to a hole punch portion by the impact of detaching the above mentioned bag, said hole punch portion is not broken. Further, regarding a display strip of the present invention having the above mentioned substrate layer including the above mentioned woven cloth related to another embodiment, even when a notched slit weakness line is formed on a hole punch caused by stopping of a knife and the like, hole punch strength is not extremely lowered.

A display strip for products in which product-enclosed bags are bonded to a display strip of the present invention related to another embodiment is also one of the present inventions. In a display strip and product assembly in which product-enclosed bags are bonded to a display strip of the present invention related to another embodiment (hereinafter called a display strip and product assembly related to another embodiment), although sealing strength of the bag and a display strip of the present invention related to another embodiment is not specifically limited, it is preferable that the sealing strength is the same as that of a display strip and product assembly of the present invention as mentioned above.

According to the present invention, a display strip easy for automating the process of bonding product enclosed bags and capable of bonding the product-enclosed bags once removed again can be provided.

Hereinafter, the present invention is explained in further detail with Examples, however, the present invention is not limited to these Examples.

Example 1

As a substrate layer, MELTAC CLOTH (manufactured by Hagihara Industries Inc., MELTAC CLOTH PE-330dt-8×8) was laminated on a biaxial oriented polyester film with a thickness of 12 μm, while extruding low density polyethylene (with a thickness of 10 μm) on the polyester film. After that, on a surface of MELTAC CLOTH, natural rubber-based adhesives were coated, thereby forming a pressure sensitive adhesive layer with a thickness of 30 μm and further, as a heat-sealable polymer layer, m-LLDPE films with a thickness of 30 μm was laminated on the pressure sensitive adhesive layer thereby manufacturing a laminated film. On heat-sealable polymer layer of the manufactured laminated film, a slit with a width of 1 μm and with 5 mm intervals with respect to the width direction was provided thereby forming weakness lines. For information, said weakness lines were formed with depth for completely cutting said heat-sealable polymer layer film. Then, the laminated film was cut to a width of 35 μm with respect to the longitudinal direction by a slit processing, thereby manufacturing a display strip.

Example 2

A display strip was manufactured by the same method as Example 1 with the exception that thin paper (70 g/m$^2$) was used as a substrate layer.

Example 3

As a substrate layer, a biaxial oriented polyethylene terephthalate film (PET film) with a thickness of 50 μm was used and corona treatment was conducted on one surface of a PET film. Next, anchor coating was conducted on a surface of the PET film subjected to corona treatment and to the anchor coated surfaces, natural rubber-based adhesives with a thickness of 50 μm were coated, thereby forming a pressure sensitive adhesive layer. A laminated film was manufactured by bonding m-LLDPE films with a thickness of 40 μm together in which a weakness line with a width of 0.5 mm and a depth of 30 μm with 10 mm intervals were formed beforehand. Then, the laminated film was cut to a width of 35 mm by a slit processing, thereby manufacturing a display strip.

Example 4

As a substrate layer, a biaxial oriented polyethylene terephthalate film (PET film) with a thickness of 50 μm was used and corona treatment was conducted on one surface of a PET film. Next, anchor coating was conducted on a surface of a PET film subjected to corona treatment and to the anchor coated surface, natural rubber-based adhesives with a thickness of 50 μm were coated, thereby forming a pressure sensitive adhesive layer. A laminated film was manufactured by bonding an EVA series sealant film with a thickness of 50 μm together in which a weakness line with a width of 0.5 mm and a depth of 45 μm with 7 mm intervals was formed beforehand. Then, the laminated film was cut to a width of 35 mm by a slit processing, thereby manufacturing a display strip.

Example 5

As a substrate layer, a biaxial oriented polyethylene terephthalate film (PET film) with a thickness of 50 μm was used and corona treatment was conducted on one surface of a PET film. Next, anchor coating was conducted on a surface of the PET film subjected to corona treatment and to the anchor coated surface, natural rubber-based adhesives with a thickness of 50 μm were coated, thereby forming a pressure sensitive adhesive layer. A laminated film was manufactured by a bonding sealant film with a thickness of 30 μm (m-LLDPE) at silicone coating treatment by a silicone treatment agent for peeling off manufactured by Dow Corning Toray Co., Ltd together so that the silicone coated surface and the pressure sensitive adhesive layer are faced each other. For information, silicone treatment was conducted so that the density becomes 100 dot/cm$^2$.

Then, the laminated film was cut to 35 mm in width by a slit processing, while at the same time, rule processing was conducted with 5 mm intervals, with a width of 0.5 mm and a depth of 25 mm by a rotary blade, thereby manufacturing a display strip.

Comparative Example 1

As a substrate layer, one surface of a biaxial oriented polyethylene terephthalate film with a thickness of 50 μm was subjected to corona treatment, and to the corona treated surface, natural rubber-based adhesives with a thickness of 50 μm were coated, thereby forming a pressure sensitive adhesive layer. On the pressure sensitive adhesive layer, an m-LLDPE film with a thickness of 40 μm was laminated, thereby manufacturing a laminated film. Then, the laminated film was cut to a width of 35 mm by a slit processing, thereby manufacturing a display strip.

Comparative Example 2

A display strip was manufactured by the same method as Comparative Example 1 with the exception that thin paper (70 g/m$^2$) was used as a substrate layer.

Pressure sensitive adhesive samples were prepared by bag materials in which 100 g content was heat bonded with display strips manufactured by Examples 1 to 5 and Comparative Examples 1 and 2 with a heat sealing temperature of 120° C., and with a sealing time of 250 m sec using a strip-pack device. For information, as strip-pack devices, those disclosed in Japan Unexamined Patent Publication 2004-90949 were used and as bag materials, films with a total thickness, that is, thickness of sealable OPP/ink/polyethylene/sealable OPP from the surface of 50 μm were used.

(1) Measurement of Initial Sealing Strength

Regarding manufactured pressure sensitive adhesive samples, using a tensile tester (manufactured by Toyo Seiki Seisaku-sho, Ltd, STROGRAPH V1-C), sealing strength was measured with a tensile speed of 300 m/min. The results were shown in Table 1.

(2) Exposure of pressure sensitive adhesive surfaces Confirmation was made by visual observation as to whether a pressure sensitive adhesive layer is exposed with a heat-sealable polymer layer peeled off with bags when bags were removed in measuring initial sealing strength. The results were shown in Table 1.

(3) Evaluation of Re-Adhesion

Once removed bag materials were physically bonded again to the portion at which a display strip was peeled off by applying pressure of 2 kg and evaluation was made based on the criteria whether bags can be suspended or not. The results were shown in Table 1.

TABLE 1

| Sample | Initial sealing strength | Exposure of adhesion surface | Re-adhesion |
| --- | --- | --- | --- |
| Example 1 | 22N | Exposed | Yes |
| Example 2 | 18N | Exposed | Yes |
| Example 3 | 19N | Exposed | Yes |
| Example 4 | 27N | Exposed | Yes |
| Example 5 | 14N | Exposed | Yes |
| Comparative Example 1 | 20N | Films expanded and no exposure | No |
| Comparative Example 2 | 18N | Films expanded and peeled off on a laminated surface with paper | No |

As shown in Table 1, in Examples 1 to 5 in which a weakness line was provided on a heat-sealable polymer layer constituting an adhesive layer, by peeling off bag materials, a heat-sealable polymer layer was also peeled off, and therefore, a pressure sensitive adhesive layer was exposed and re-adhesion of bag materials was available. In addition, from the results of Example 5, by conducting silicone treatment on a surface which is opposite to a pressure sensitive adhesive layer of a heat-sealable polymer layer, initial sealing strength can be inhibited, thereby capable of obtaining further stable initial strength.

INDUSTRIAL APPLICABILITY

According to the present invention, a display strip easy for automating the process of bonding product-enclosed bags and capable of bonding the product-enclosed bags once removed again can be provided.

The description of this application claims benefit of priority based on Japan Patent Application No. 2004-311102, the entire same contents of which are incorporated by reference herein.

What is claimed:

1. A display strip for holding and displaying a plurality of product-enclosed bags, comprising at least a substrate layer and an adhesive layer, said adhesive layer has a layer structure of two or more layers comprising a heat-sealable polymer layer which composes the outmost layer of the display strip and a pressure sensitive adhesive layer which composes the inner layer of said heat-sealable polymer layer, said heat-sealable polymer layer includes a hot melt resin which has substantially no adhesion at a normal temperature and is bondable to said bags, said pressure sensitive adhesive layer comprises adhesives which have adhesion at a normal temperature and said heat-sealable polymer layer has a weakness line at least in the vicinity of portions at which said product-enclosed bags are heat bonded, wherein said heat-sealable polymer layer has a first surface facing said pressure sensitive adhesive layer and wherein at least a portion of said first surface is at least partially covered with a silicone-containing material.

2. The display strip as set forth in claim 1, wherein said weakness line is formed so that said heat-sealable polymer layer is surely destroyed to expose said pressure sensitive adhesive layer when said product-enclosed bag heat bonded by said heat sealing is removed.

3. The display strip as set forth in claim 1, wherein said hot melt resin is the resin selected from the group which consists of polypropylene, copolymer of propylene and other olefin, low-density polyethylene, and ethylene/vinyl acetate copolymer.

4. The display strip as set forth in claim 1, wherein said pressure sensitive adhesive is a rubber-based adhesive or an acrylic adhesive.

5. The display strip as set forth in claim 1, wherein said substrate layer consists of a biaxial oriented polypropylene, a biaxial oriented polyethylene terephthalate, a paper, a metal, a non-woven cloth, a woven-cloth, or a laminate thereof.

6. The display strip as set forth in claim 5, wherein said substrate layer consists of a laminate in which a woven cloth is laminated on a biaxial oriented polypropylene, a biaxial oriented polyethylene terephthalate, or a paper.

7. The display strip as set forth in claim 5, wherein said woven cloth is composed of a flat yarn.

8. The display strip as set forth in claim 5, wherein a biaxial oriented polypropylene, a biaxial oriented polyethylene terephthalate, or a paper and a woven cloth are laminated interposing via an intermediate layer comprising polyethylene.

9. The display strip as set forth in claim 1, wherein an anchor coat layer is formed between said substrate layer and said adhesive layer.

10. The display strip as set forth in claim 1, wherein said weakness line is a slit line or a perforation.

11. The display strip as set forth in claim 1, wherein said weakness line is a continuous line or a broken line.

12. The display strip as set forth in claim 1, wherein said weakness line is composed of shapes which divide regions in which said bags can be heat bonded.

13. The display strip as set forth in claim 11, wherein said weakness line is formed in the width direction with intervals in the longitudinal direction of the display strip, and wherein said weakness line is formed extending to the edge in the width direction of the heat-sealable polymer layer along the portion in which said bags are heat bonded by heat bonding.

14. The display strip as set forth in claim 1, wherein a suspending-use hole punch is provided in an upper portion of said display strip.

15. A display strip for holding and displaying a plurality of product-enclosed bags, comprising at least from a substrate layer and an adhesive layer, said substrate layer has a structure of including woven cloths, said adhesive layer has layer structure of two or more layers comprising a heat-sealable polymer layer which composes the outmost layer of the display strip and a pressure sensitive adhesive layer which composes an inner layer of said heat-sealable polymer layer, said heat-sealable polymer layer includes a hot melt resin which has substantially no adhesion at a normal temperature and is bondable to said bags, said pressure sensitive adhesive layer comprises adhesives which have adhesion at a normal temperature and further, a suspending-use hole punch is provided in an upper portion of said display strip, wherein said heat-sealable polymer layer has a first surface facing said pressure sensitive adhesive layer and wherein at least a portion of said first surface is at least partially covered with a silicone-containing material.

16. The display strip and product assembly, wherein product-enclosed bags are held to a display strip set forth in claim 15.

17. A display strip and product assembly composed at least of product-enclosed bags and a display strip with plural of these bags held and displayed thereto, wherein said display strip comprises a substrate layer and an adhesive layer, said adhesive layer has a layer structure of two or more layers comprising a heat-sealable polymer layer which composes an outmost layer of a display strip and a pressure sensitive adhesive layer which composes an inner layer of said heat-sealable polymer layer, said heat-sealable polymer layer includes a hot melt resin which has substantially no adhesion at a normal temperature and is bondable to said bags, said pressure sensitive adhesive layer comprises adhesives which have adhesion at a normal temperature and said heat-sealable polymer layer has a weakness line at least in the vicinity of the portion in which said bags are heat bonded, wherein said heat-sealable polymer layer has a first surface facing said pressure sensitive adhesive layer and wherein at least a portion of said first surface is at least partially covered with a silicone-containing material.

* * * * *